Inventor
Thomas W. Steele

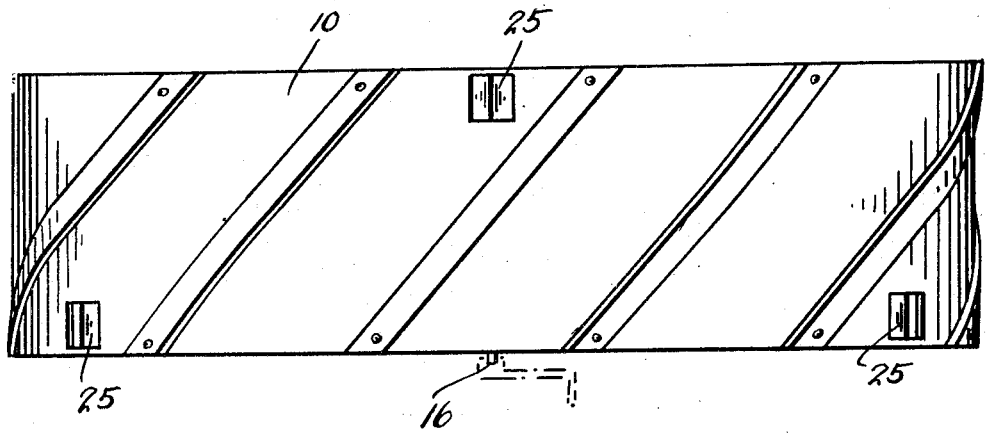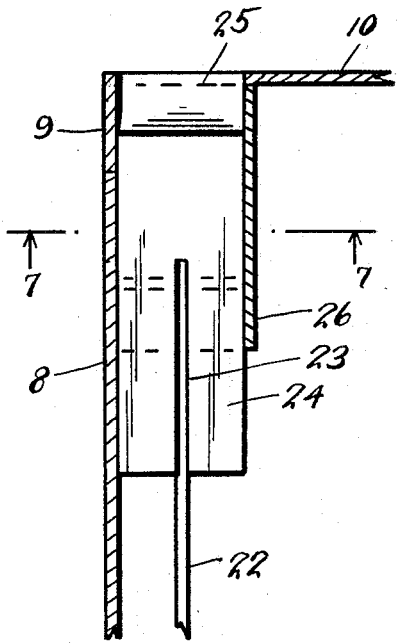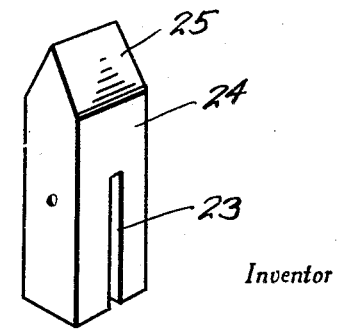

Patented Sept. 8, 1931

1,822,634

UNITED STATES PATENT OFFICE

THOMAS W. STEELE, OF HUDSON FALLS, NEW YORK

TRACTOR WHEEL

Application filed March 18, 1931. Serial No. 523,593.

The present invention relates to tractors and particularly to tractor wheels and the prime object of the invention resides in the provision of means whereby the tractor wheel, regardless of the weight imposed upon it, may ride smoothly over surfaces such as that of a modern hard surfaced road, and may have increased tractive effect when riding over soft earth, snow and the like.

Another important object of the invention resides in the provision of a lug structure in combination with a tractor wheel whereby means are provided for projecting the lugs outwardly of the rim of the wheel or retracting them inwardly therefrom as may be desired.

A still further very important object of the invention resides in the provision of a wheel structure of this nature which is exceedingly simple, strong and durable, inexpensive to manufacture, thoroughly efficient and reliable in use, easy to manipulate, compact and convenient in its arrangement of parts, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 5 is a plan view of the wheel rim.

Figure 6 is a detail section taken substantially on the line 6—6 of Figure 3.

Figure 7 is a detail section taken substantially on the line 7—7 of Figure 6.

Figure 8 is a perspective view of one of the lugs.

Figure 9 is a detail section taken substantially on the line 9—9 of Figure 3, and Figure 10 is a perspective view of the gear segment.

Figure 1:
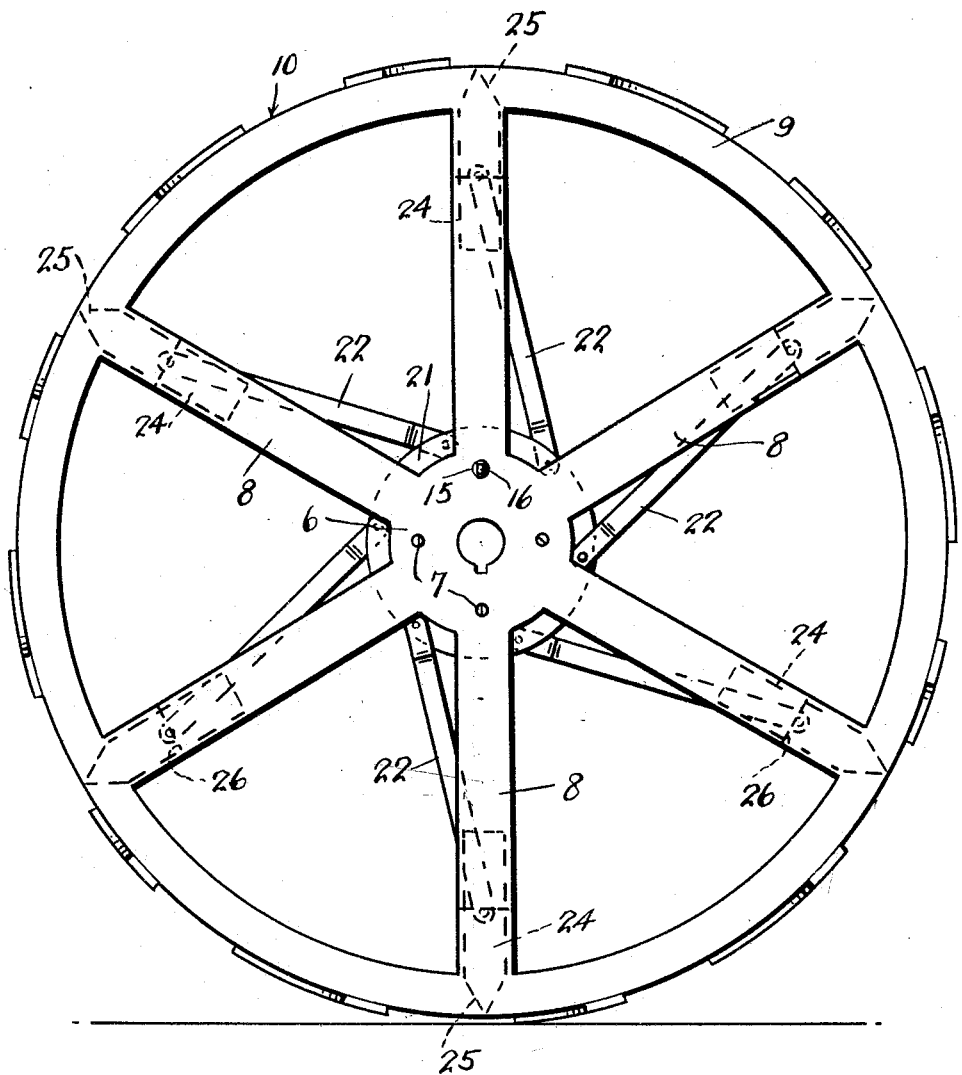
Figure 1 is a side elevation of a wheel embodying the features of my invention.
Figure 2:
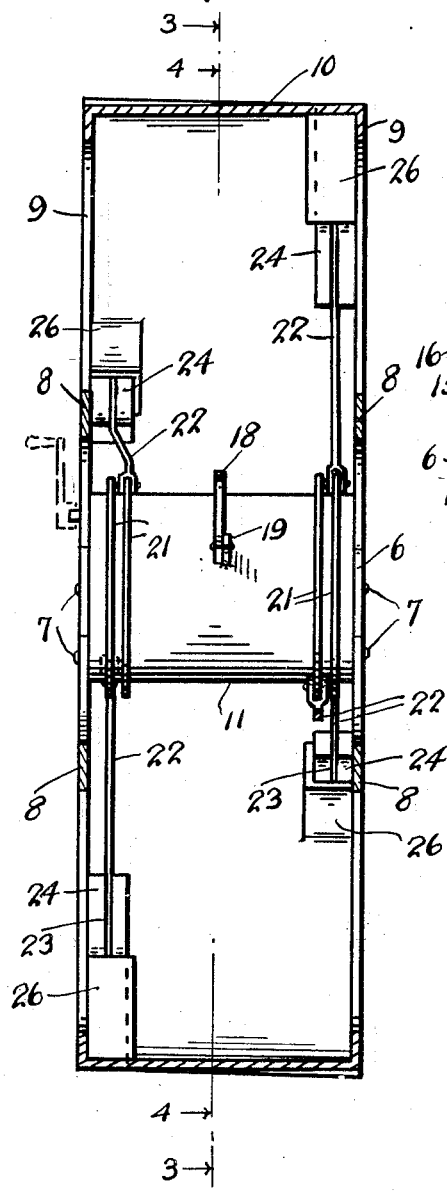
Figure 2 is a sectional view therethrough.

Referring to the drawings in detail it will be seen that the numeral 5 denotes a hub with plates 6 fastened on the ends thereof as at 7 and having spokes 8 radiating therefrom and merging into annular flanges 9 which project inwardly from the edges of a rim 10. These features of the wheel are not of the essence of the invention but rather have been disclosed merely to exemplify my improved structure about to be described in detail.

A sleeve 11 is rockable about the hub 5 and is formed with a slot 12 to register with a recess 14 formed in the periphery of the hub 5. A shaft 15 is journalled through the hub 5 parallel with its axis and has one end extending through an opening in one plate 6 and terminating in a square terminal 16 so that a crank or the like may be engaged therewith for turning the shaft. The other end of the shaft terminates in the recess 14 and has thereon a pinion 17. This pinion 17 meshes with teeth of a gear segment 18 carried by lugs 19 projecting from the sleeve 11. Two pairs of annular flanges 21 are formed on the sleeve 11, one pair adjacent each end thereof. A plurality of connecting rods 22 have their inner ends bifurcated and straddling the flanges 21 and pivoted thereto. The outer ends of these connecting rods extend into and are pivoted in recesses 23 formed in the inner portions of lugs 24, the outer ends of which are beveled to form an edge which will readily penetrate soft dirt, snow and the like as is indicated at 25.

Figure 3:
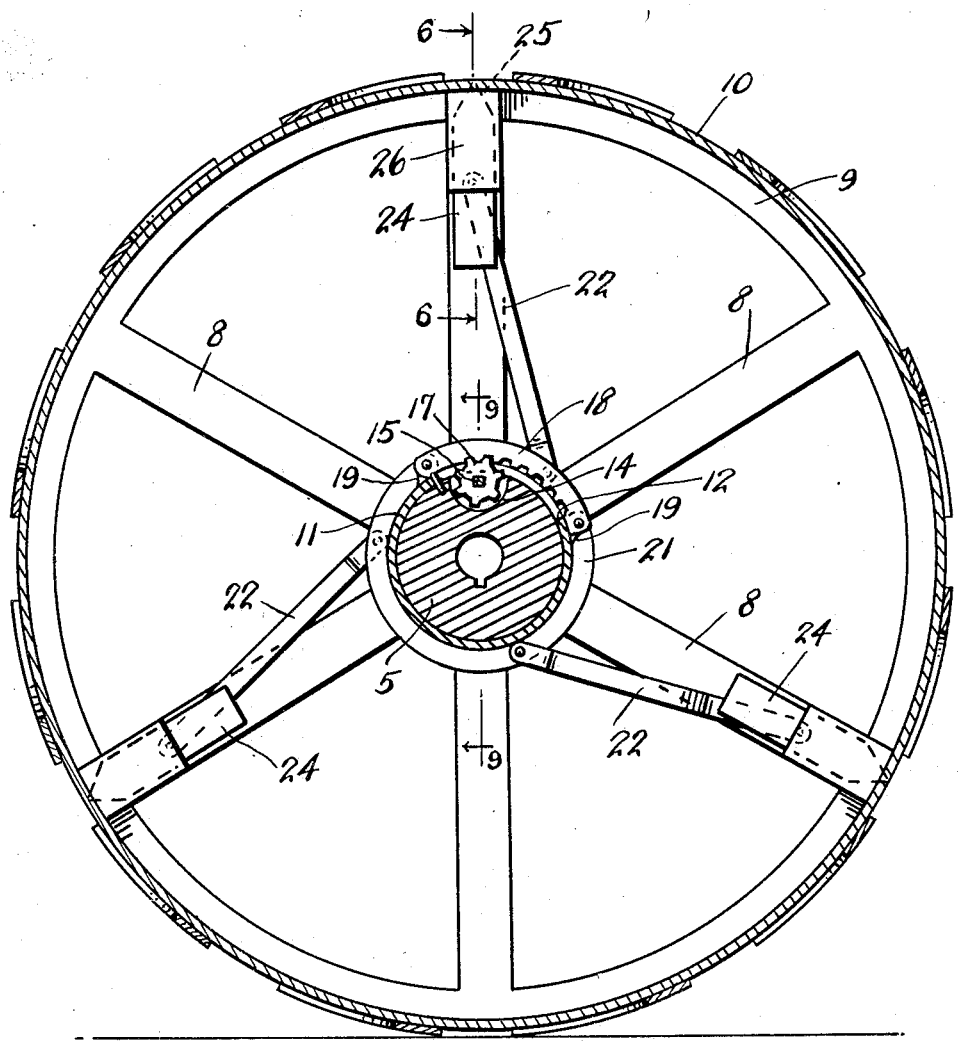
Figure 3 is another sectional view therethrough taken substantially on the line 3—3 of Figure 2 showing the lugs in retracted position.
Figure 4:
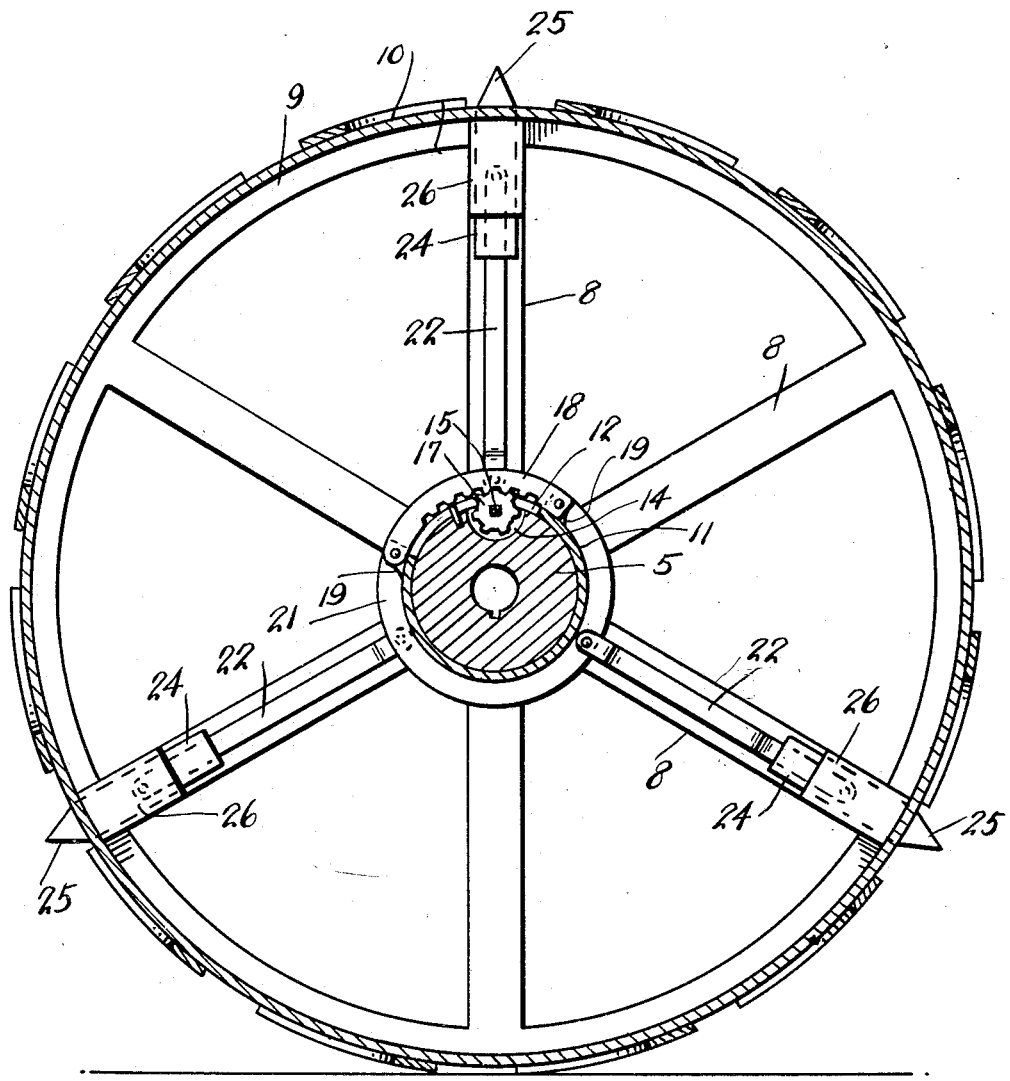
Figure 4 is a similar section taken substantially on the line 4—4 of Figure 2 showing the lugs projected.

These lugs 24 are slidable in open ended casings 26 projecting inwardly from the rim 10 in registry with openings therein. As will be seen, the spokes 8 are of flat construction and the outer walls of the casing are formed by portions of these spokes and portions of the flanges 9. The casings are alternately arranged with respect to each other on both sides of the rim. It will be quite obvious that by causing the turning of the shaft 15 this will cause the rocking of the sleeve 11 which through the gearing and the connecting rods will cause the projection of the lugs to the position shown in Figure 4 or the retraction of the lug to the position shown in Figure 3.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with the hub and rim of a tractor wheel and flat spokes connecting the hub with the rim, a sleeve rotatably arranged on the hub held on the hub by parts of the spokes, said hub having a recess therein and the sleeve having an elongated transversely arranged slot for communication with the recess, a shaft rotatably arranged in the hub and extending through one end thereof for receiving a handle with its other end located in the recess, a pinion on said end and located in the recess and slot, lugs on the sleeve adjacent the ends of the slot, a segmental rack having its ends connected to the lugs and extending over the slot with its teeth in engagement with the pinion, a pair of flanges on the sleeve adjacent each end thereof, a plurality of links, having their inner ends forked, located at each side of the wheel, some of the forked ends at each side of the wheel being pivoted to one of the flanges of a pair and the forked ends of the other links being pivoted to the other flange of the pair, casings connected with the rim and having their outer walls formed of parts of the spokes, lugs located therein and having their inner ends pivoted to the outer ends of the links, and said rim having openings therein in communication with the casings.

In testimony whereof I affix my signature.

THOMAS W. STEELE.